United States Patent
Schlueter et al.

(12) 
(10) Patent No.: US 10,825,107 B2
(45) Date of Patent: Nov. 3, 2020

(54) MATERIALITY DETERMINATION AND INDICATION SYSTEM

(71) Applicant: SAP SE, Walldorf (DE)

(72) Inventors: Ulrich Schlueter, Schriesheim (DE); Florian Roll, Cologne (DE)

(73) Assignee: SAP SE, Walldorf (DE)

( * ) Notice: Subject to any disclaimer, the term of this patent is extended or adjusted under 35 U.S.C. 154(b) by 271 days.

(21) Appl. No.: 15/896,350

(22) Filed: Feb. 14, 2018

(65) Prior Publication Data

US 2019/0251637 A1    Aug. 15, 2019

(51) Int. Cl.
*G06Q 40/00* (2012.01)
*G06F 16/26* (2019.01)
*G06F 16/215* (2019.01)

(52) U.S. Cl.
CPC .......... *G06Q 40/12* (2013.12); *G06F 16/215* (2019.01); *G06F 16/26* (2019.01)

(58) Field of Classification Search
None
See application file for complete search history.

(56) References Cited

U.S. PATENT DOCUMENTS

| | | | | |
|---|---|---|---|---|
| 6,658,568 B1 * | 12/2003 | Ginter | ................. | G06F 21/10 348/E5.006 |
| 7,165,174 B1 * | 1/2007 | Ginter | ................. | G06F 21/10 705/51 |
| 8,316,237 B1 * | 11/2012 | Felsher | ................. | H04L 9/0825 380/282 |
| 10,497,065 B1 * | 12/2019 | Sheehy | ................. | G06Q 40/12 |
| 2006/0218651 A1 * | 9/2006 | Ginter | ................. | G06F 21/00 726/27 |
| 2008/0120240 A1 * | 5/2008 | Ginter | ................. | G06F 21/10 705/51 |
| 2015/0037006 A1 * | 2/2015 | Tapper | ................. | G11B 27/10 386/241 |
| 2017/0161263 A1 * | 6/2017 | Gordon | ................. | G06N 5/04 |

\* cited by examiner

*Primary Examiner* — Fateh M Obaid

(74) *Attorney, Agent, or Firm* — Buckley, Maschoff & Talwalkar LLC

(57) ABSTRACT

Provided are systems and methods for determining a materiality threshold of a local data value for a group data value. In one example, a method includes receiving a group data file and a local data file, identifying a local data value from the local data file and a corresponding confidential group data value from the group data file, determining whether an error or an omission in combining the local data value with the confidential group data value impacts a materiality threshold of the confidential group data value, and generating and displaying a materiality indicator that visually indicates whether the local data value is going to impact a materiality threshold of the confidential group data value. According to various aspects, a user can quickly identify whether a coding process is doing to affect a materiality of a data value from a larger group.

20 Claims, 7 Drawing Sheets

300

| Local Account ID | Local Description | Group Account ID | Group Account Description |
|---|---|---|---|
| 310300 | Revenues coffee machines | R120600 | Revenues Consumer Segment |
| 310400 | Revenues water treatment products | R120600 | Revenues Water Segment |
| 310500 | Revenues from maintenance services | R120800 | Revenues Water Segment |
| ... | | ... | |
| 110000 | Spare part Inventories | A580150 | Current Inventories |
| ... | | ... | |

| Local account ID (311) | Local Description | Local Data Value Recorded (412) | Group Account ID (321) | Group Description | Group Data Value Recorded (*) (422) | Contribution of Local Value to Group Value (*) (432) | Materiality threshold to Group Value (*) (434) | Materiality Indicator (436) |
|---|---|---|---|---|---|---|---|---|
| 310300 | Revenues coffee machines | 500k US | R120600 | Revenues Consumer Segment | 10M US | 5.0% | 500k US (WARN) | Yes |
| 310400 | Revenues water treatment products | 400k US | R120600 | Revenues Water Segment | 2M US | 20.0 % | 500k US | No |
| 310500 | Revenues from maintenance services | 30k US | R120800 | Revenues Water Segment | 2M US | 1.5% | 500k US | No |
| ... | | | | | | | | ... |
| 110000 | Spare part Inventories | 100k US | A580150 | Current Inventories | 1M US | 10.0% | 50K US (WARN) | Yes |
| ... | | | | | | | | ... |

| Local Account ID | Local Account Description | Local Data Value | Group Account ID | Group Account Description | Materiality Indicator |
|---|---|---|---|---|---|
| 310300 | Revenues coffee machines | 500k US | R120600 | Revenues Consumer Segment | Yes - Critical |
| 310400 | Revenues water treatment products | 400k US | R120600 | Revenues Water Segment | No but Close |
| 310500 | Revenues from maintenance services | 30k US | R120800 | Revenues Water Segment | No |
| ... | | ... | | ... | ... |
| 110000 | Spare part Inventories | 100k US | A580150 | Current Inventories | Yes |
| ... | | | | | |

441

| Local Account ID | Local Account Description | Local Data Value | Group Account ID | Group Account Description |
|---|---|---|---|---|
| *310300* | *Revenues coffee machines* | *500k US* | *R120600* | *Revenues Consumer Segment* |
| 310400 | Revenues water treatment products | 400k US | R120600 | Revenues Water Segment |
| 310500 | Revenues from maintenance services | 30k US | R120800 | Revenues Water Segment |
| ... | | ... | | |
| *110000* | *Spare part Inventories* | *100k US* | *A580150* | *Current Inventories* |
| ... | | | | |

451

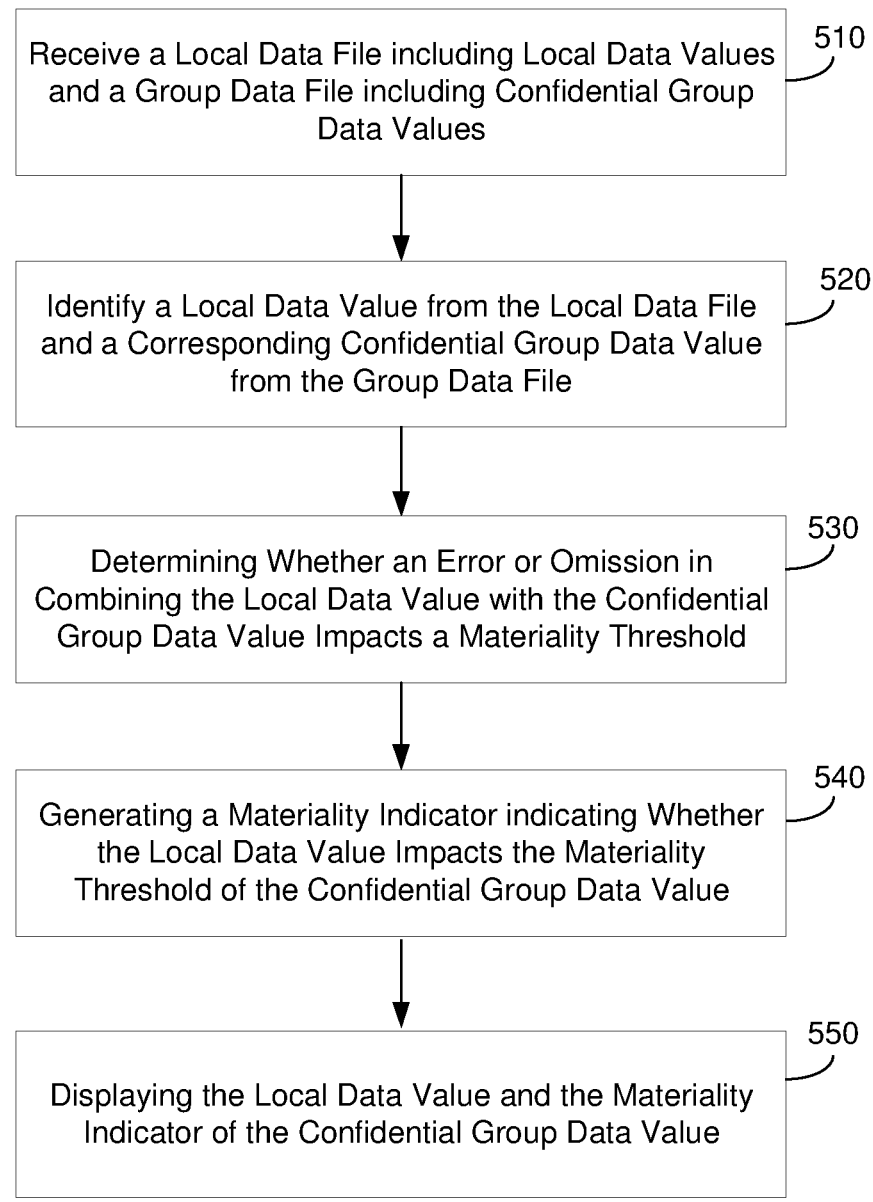

MATERIALITY DETERMINATION AND INDICATION SYSTEM

BACKGROUND

Developing accurate totals in organizational statements is a key tenet of an effective period-end closing process. Oftentimes, organizations are made up of multiple subsidiaries, divisions, units, or the like, which must be combined for purposes of accounting. In this case, statements belonging to the different subsidiaries which are part of a common group may be aggregated and converted to create a global record for the organization as a whole. In order to aggregate local data with the group data, local entities typically must map their local codes (e.g., account, label, ID, etc.) to a common group code that is used by the group. From a group perspective, these codes must be harmonized to a common coding otherwise information will be incorrectly recorded.

Industry and governments routinely cause modifications to accounting practices such as those designed to ensure compliance with rules, regulations and best practices. With every change that takes place in a local accounting system, a business model, a corporate guideline, a government regulation, and the like, subsidiary entities are required to review the changes and often must create new mappings between their local code and the group code. This can be a very time consuming process because the changes can be significant such as the splitting of data into different codes, and the like. However, some local data may have no impact or very little impact on the group data when aggregated together as a whole. The concept of materiality has been used to prevent a subsidiary from spending significant amounts of time on local data which is not material thereby enabling the subsidiary to spend more times on information that is material. Information is said to be material if omitting the information or misstating the information could influence decisions that users make on the basis of an entity's financial statements. Put differently, materiality is an entity-specific aspect of relevance, based on the size, or magnitude, or both, of the items to which financial information relates. However, materiality is often determined by an accounting professional of the group that must view many different documents (including hidden/inaccessible data) to provide an accurate determination as to what is material and what is not material to an organization.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 4A-4B are diagrams illustrating a user interface displaying materiality indicators which may be used in the process of FIG. 3, in accordance example embodiments.

FIG. 5 is a diagram illustrating a method of generating and providing materiality indicators in accordance with an example embodiment.

Figure 1:
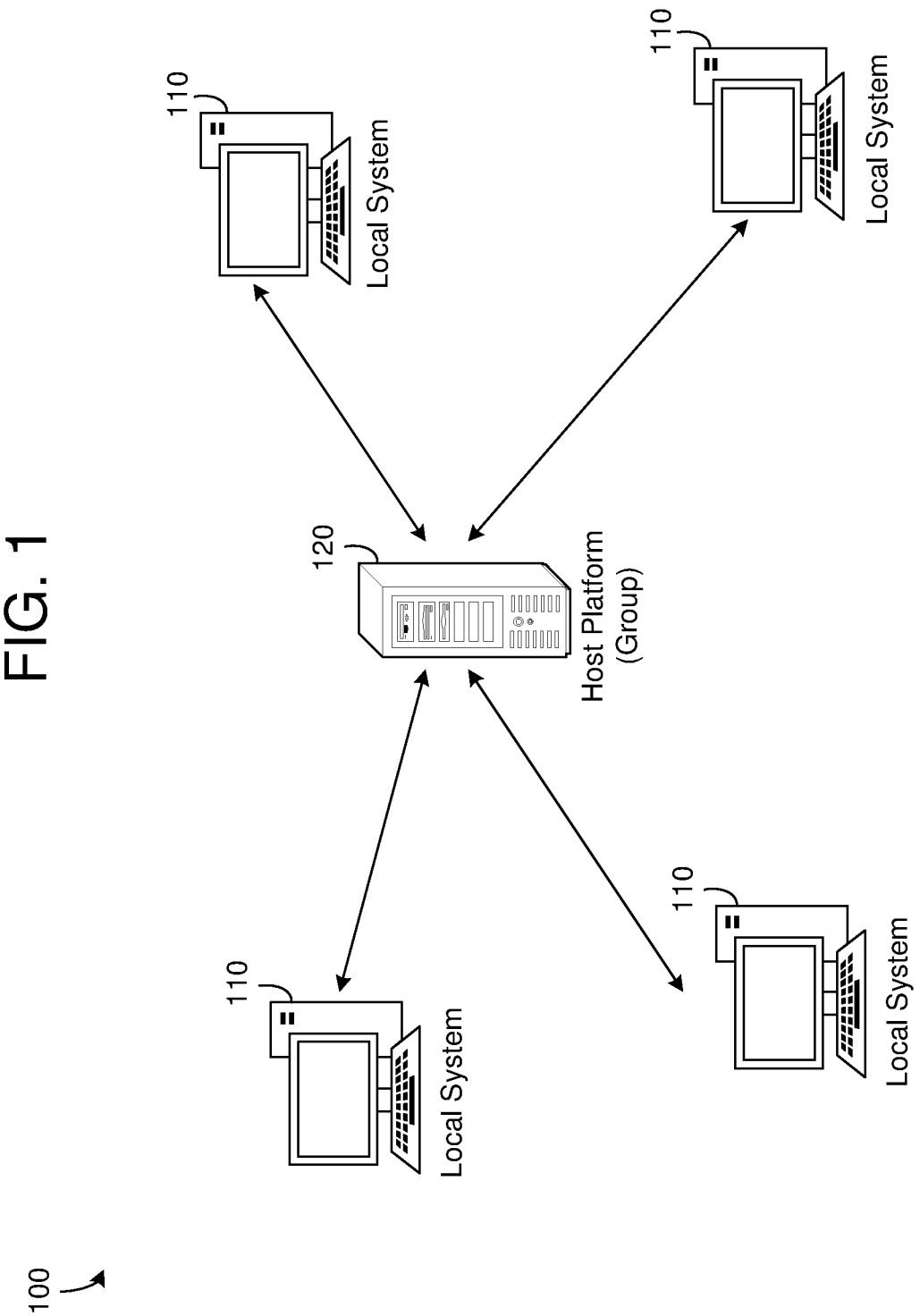
FIG. 1 is a diagram illustrating a computing network in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a system that determines whether a local data value will impact a materiality threshold of a group data value when the local data value is combined or otherwise aggregated with the group data value. The system may generate a materiality indicator that visually indicates whether the local data value will impact the materiality threshold of the group data value. The system can further display a user interface including the local data value and the materiality indicator thereby notifying the local user whether the local data value associated with the local user will impact a materiality of a group data value of a group of users. In some embodiments, the group data value may be confidential or otherwise private and not for view by the local user. Through the system described herein, the local user can be provided with a materiality notification even when the local user is not allowed or otherwise does not have access to view the group data value. As a result, the system can maintain the confidentiality of group records while still providing the local user with a notification when local data value is material. In some embodiments, the system may be incorporated with or used in conjunction with a mapping program in which local codes are mapped to group codes for auditing purposes.

In auditing financial statements, the concept of materiality is common practice. Information may be considered material if omitting it or misstating it could influence decisions that users make on the basis of an entity's financial statements. Put another way, materiality is an entity-specific aspect of relevance, based on a size, a magnitude, or both of the items to which financial information relates. While there is no general rule for materiality, data values may be regularly considered material if they exceed a certain fraction of a total position. For example, a system may define that a balance sheet would be materially incorrect if an omitted asset financial position is larger than 0.5% of the total assets. However, what is material to one entity's data may not be material to another entity's data. Therefore, the materiality threshold of a data value may be dynamically adjusted based on attributes of the entity associated with the data, attributes of the data value itself, and the like.

Parent organizations are often required to submit financial documents of all subsidiaries as part of a common group or a whole balance sheet. Therefore, local subsidiary statements are often aggregated together into a common group statement. In order to perform the mapping, local data such as accounts, descriptions, etc., must be mapped to corresponding group data. For example, a local account is typically different from a common group account. Also, a description of the data/account is often different between the local system and the group system. Therefore, each local user (e.g., subsidiary, local system, etc.) is often required to map local data codes to corresponding group data codes. However, this mapping process is not performed with any understanding of how the local data will affect the group data. In particular, whether a local data value materially impacts a group data value is usually determined by license professionals and can take significant time and energy.

With every change in the local accounting system and/or group accounting system, business models, corporate accounting guidelines, new financial regulations or new acquisitions, accountants and controllers of affected subsidiaries need to review or create mappings from the local code to the group code. This can be a time-consuming process and sometimes it will not be fully clear which group code is the correct one or amounts will even need to be split. The example embodiments can relieve some of the burden on affected subsidiaries and other local users by determining and displaying a materiality indicator next to local data values even in situations where the group data value needs to be hidden. As a result, a local user can readily identify which coding will have an impact on the group financial data.

According to various embodiments, the system described herein can automatically determine and display a materiality indicator for each local data value (e.g., account) that indicates its materiality threshold to the group data value. The affected amounts may be shown with an indication if they are material. For example, the materiality indicator may assist the local user by giving additional information to the local user indicating how much a mapping decision will influence the group results. As a non-limiting example, a column of data in a spreadsheet or chart being displayed via a user interface may include a materiality threshold of the group account (defined e.g. as a percentage of another key figure). The system may also generate information indicating whether the mapping decision may lead to a material deviation and provide a word of warning. Accordingly, a local user can focus on the amounts which are material while being relieved of worrying about non-material amounts. In addition, the local user can provide alternate mappings in a scenario where the local user is unsure and can review results based on mapping alternatives.

FIG. 1 is a diagram illustrating a computing network 100 in accordance with an example embodiment. Referring to FIG. 1, the computing network 100 includes a plurality of local systems 110 representing a plurality of respective local users. The computing network 100 also includes and a central host platform 120 which can aggregate and store data together from the group of local systems 110 into a combined data representation such as a data file. As a non-limiting example, each local system 110 may correspond to a subsidiary or unit within a larger organization, however embodiments are not limited thereto. Local data values from the local systems 110 may be transmitted to the host platform 120 or accessed by the local systems via the host platform 120. The host platform 120 may aggregate the local data into a single or global data file. Here, the host platform 120 may include or otherwise be coupled to a database for storing data files and data records. Each local system 110 may access the host platform 120 via a network connection such as the Internet, a private network, a combination thereof, and the like.

In some cases, the functions of a local system 110 are combined in one single cloud solution together with the host platform 120. In this example, multiple local systems are not involved but rather different areas of data can be accessed by different users via a central platform such as the host platform 120. For example, a subsidiary, via a local system, may be able to access one portion of data stored on the host platform 120 while a different subsidiary may be able to access a different portion of data stored on the host platform 120. In this example, each subsidiary can work on the central host platform 120 however only be authorized to see the part of the data associated with the subsidiary.

In an example, the local systems 110 may each generate a respective local data file that includes local statement information such as accounts, amounts, profits, margins, descriptions, and the like, and submit the information to the host platform 120 for aggregation with local information from all local systems 110. During this process, the host platform 120 may manage and output a user interface to a display device of each of the local systems 110. The user interface may include a display of local user data from a respective local system 110. However, group data values may be confidential or restricted from view by the local systems 110. Therefore, the group data values may be obscured or otherwise removed from view of the local systems 110.

The group data may represent global data values that are aggregated from some or more of the local systems 110. In some embodiments, the group data values may be confidential. In this case, a local system 110 may not be able to see group data values such as specific monetary numbers, descriptions, materiality numbers, or the like. However, the host platform 120 may output materiality information about the group data values to provide the local systems 110 insight into how their local data values are going to impact the group as a whole. For example, the host platform 120 may determine and output a materiality indicator for each group data value indicating whether the local data value of a respective local system 110 is going to materially impact the corresponding group data value from the aggregate of all local systems 110. The materiality indicator may include a simple "yes" or "no" answer. However, in other examples, the materiality indicator may provide additional description or level of materiality. As another example, the materiality indicator may be in the form of a visual descriptor such as a shading, a coloring, a symbol, a highlighting, a text editing function, or the like.

By providing a local system 110 with materiality information, the local user of the local system 110 can identify which local data values are likely to materially impact the group as a whole and which local data values are likely to be insignificant. Accordingly, when the local user is performing a mapping operation between a local data file including the local data values and a group data file including the group data values, the local user can identify which mapping operations are likely to be material and which mapping operations are likely to have no significant affect on the accounting of the group data. This can ease the burden on the local user by providing an indication of which local values are to be more thoroughly focused on during the mapping operation.

Figure 2:
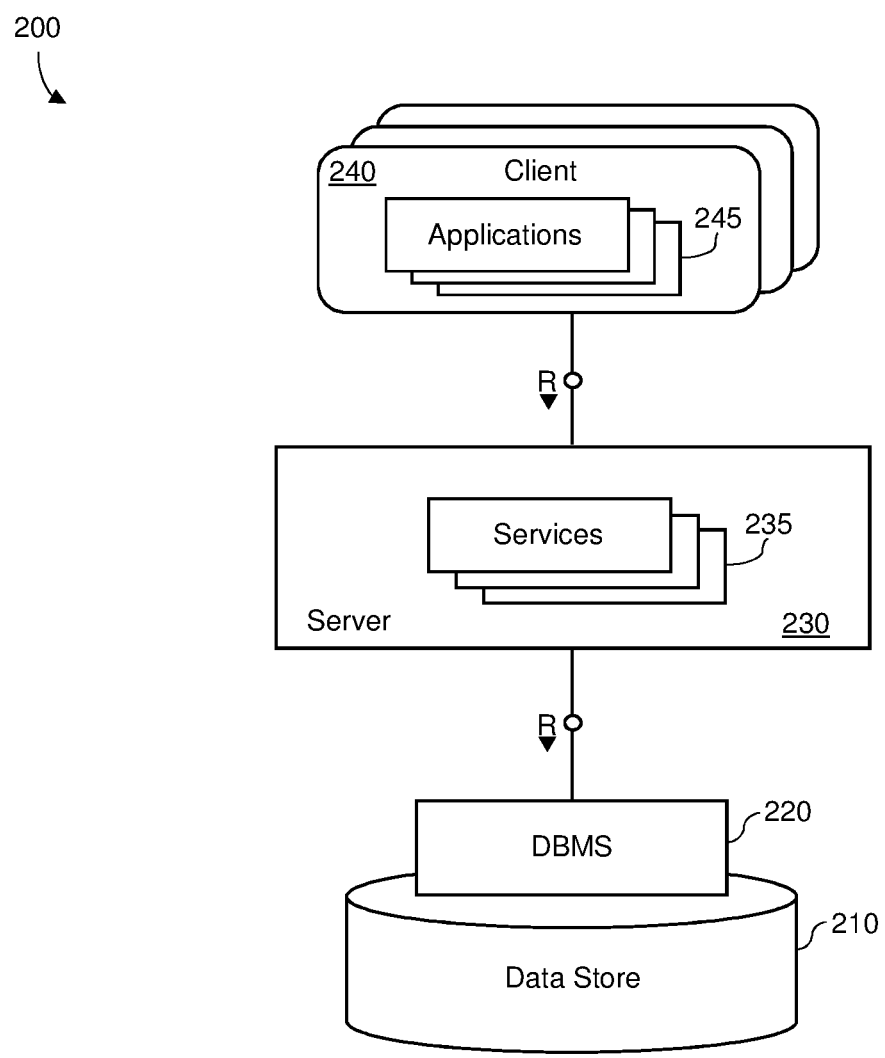
FIG. 2 is a diagram illustrating a database architecture in accordance with an example embodiment.

FIG. 2 illustrates an example of a database architecture 200 which may be included within the host platform 120 of FIG. 1, in accordance with an example embodiment. It should be appreciated that the embodiments are not limited to architecture 200 or to a database architecture, however, FIG. 2 is shown for purposes of example. Referring to FIG. 2, the architecture 200 includes a data store 210, a database management system (DBMS) 220, a server 230, services 235, clients 240 and applications 245. Generally, services 235 executing within server 230 receive requests from applications 245 executing on clients 240 and provides results to applications 245 based on data stored within data store 210. For example, server 230 may execute and provide services 235 to applications 245. Services 235 may include server-side executable program code (e.g., compiled code, scripts, etc.) which provide functionality to applications 245 by providing user interfaces to clients 240, receiving requests from applications 245 (e.g., drag-and-drop operations), retrieving data from data store 210 based on the requests, processing the data received from data store 210, and providing the processed data to applications 245.

In a non-limiting example, one or more applications 245 correspond to an auditing software for use in aggregating accounting data from across multiple subsidiaries. In this example, the application 245 may be used for mapping local data files to group data files. According to various embodiments, the application 245 may determine and display a materiality indicator as described herein. In this example, a client 240 executes the application 245 to generate a user interface on a display of the client 240 which allows the user to map local data values to confidential group data values, for example, accounts, descriptors, profits, costs, and the like. The application 245 may pass the local data values based on the input to one of services 235. A Structured Query Language (SQL) script may be generated based on the request and forwarded to DBMS 220. DBMS 220 executes the SQL script to return a result set based on data of data store 210 which may include local data, group data, and the like, and the application 245 creates a report/visualization based on the result set. As another example, the local data may be provided directly from the application to the DBMS 220 or the data store 210.

The services 235 executing on server 230 may communicate with DBMS 220 using database management interfaces such as, but not limited to, Open Database Connectivity (ODBC) and Java Database Connectivity (JDBC) interfaces. These types of services 235 may use SQL to manage and query data stored in data store 210. The DBMS 220 serves requests to query, retrieve, create, modify (update), and/or delete data of data store 210, and also performs administrative and management functions. Such functions may include snapshot and backup management, indexing, optimization, garbage collection, and/or any other database functions that are or become known.

Server 230 may be separated from or closely integrated with DBMS 220. A closely-integrated server 230 may enable execution of services 235 completely on the database platform, without the need for an additional server. For example, server 230 may provide a comprehensive set of embedded services which provide end-to-end support for Web-based applications. The services 235 may include a lightweight web server, configurable support for Open Data Protocol, server-side JavaScript execution and access to SQL and SQL Script. Server 230 may provide application services (e.g., via functional libraries, etc.) using services 235 that manage and query the data of data store 210. The application services can be used to expose the database data model, with its tables, views and database procedures, to clients 240. In addition to exposing the data model, server 230 may host system services such as a search service.

Data store 210 may include any query-responsive data source or sources that are or become known, including but not limited to SQL relational database management system. Data store 210 may include a relational database, a multi-dimensional database, an Extensible Markup Language (XML) document, or any other data storage system storing structured and/or unstructured data. The data of data store 210 may be distributed among several relational databases, dimensional databases, and/or other data sources. Embodiments are not limited to any number or types of data sources. In some embodiments, the data of data store 210 may include one or more of tabular data, row-based data, column-based data, and object-based data. As another example, the data store 210 may include a document-oriented database that stores data in Extensible Markup Language (XML) format, JavaScript Object Notation (JSON) format, and the like. Moreover, the data may be indexed and/or selectively replicated in an index to allow fast searching and retrieval thereof. Data store 210 may support multi-tenancy to separately support multiple unrelated clients by providing multiple logical database systems which are programmatically isolated from one another.

The architecture 200 may include metadata defining objects which are mapped to logical entities of data store 210. The metadata may be stored in data store 210 and/or a separate repository (not shown). The metadata may include information regarding dimension names (e.g., country, year, product, account, etc.), dimension hierarchies (e.g., country, state, city, group, local, etc.), measure names (profit, units, sales, IDs, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 240 may include one or more devices executing program code of an application 245 for presenting user interfaces to allow interaction with application server 230. The user interfaces of applications 245 may include user interfaces suited for reporting, data analysis, and/or any other functions based on the data of data store 210. Presentation of a user interface as described herein may include any degree or type of rendering, depending on the type of user interface code generated by server 230. For example, a client 240 may execute a Web Browser to request and receive a Web page (e.g., in HTML format) from application server 230 via HTTP, HTTPS, and/or Web Socket, and may render and present the Web page according to known protocols. One or more of clients 240 may also or alternatively present user interfaces by executing a standalone executable file (e.g., an .exe file) or code (e.g., a JAVA applet) within a virtual machine.

Figure 3:
FIG. 3 is a diagram illustrating a user interface for use in a coding process between a local data file and a group data file in accordance with an example embodiment.

FIG. 3 illustrates a user interface 300 for use in a coding process between a local data file and a group data file in accordance with an example embodiment. For example, the user interface 300A may be displayed via a local system and/or a group system. Referring to FIG. 3, the user interface 300 displays a local account ID 311 which needs to be mapped to a corresponding group account ID 321. The same mapping may be needed on other objects than accounts or combinations of local codes to be mapped to group codes. The local account also includes a local account description 312 which needs to be mapped to a group account description 322. The local account ID 311 and the local account description 312 may be included in a local data file having a tabular format. Likewise, the group account ID 321 and the group account description 322 may be stored in a group data file having a similar tabular format as the local data file.

However, in this example, the local account ID 311 is different from the group account ID 312, and the local account description 312 is different from the group account description 322. Therefore, a mapping process may be performed to ensure that data values (not shown) associated with the local account ID 311 and/or the local account description 312 are correctly mapped to the group account ID 321 and/or the group account description 322. The mapping process may generate a coding between the local account ID 311 and the group account ID 321 when data transmissions are performed from a local system to a group system. The definition of the mapping rules may be performed by the local user to map a local account balance or other amount (not shown) from local account ID 311 to group account balance or other amount corresponding group-wide account represented by group account ID 321. As another example, multiple local fields may be mapped to a single group code. For example, a local account number and a local cost center ID may together determine a group account where data is to be mapped.

FIGS. 4A and 4B illustrate user interfaces 400A and 400B displaying materiality information and materiality indicators which may be used in the mapping process of FIG. 3, in accordance example embodiments. The user interfaces 400A and 400B may be displayed via a local user system such as a local system 110 and/or a group system such as host platform 120. Referring to FIG. 4A, user interface 400A displays the same local account ID 311 and group account ID 321 information as shown in FIG. 3. In addition, the user interface 400A displays a local data value 412 associated with a local account, a group data value 422 associated with the group account, and fields of materiality information 432, 434, and 436 based on the group account and/or the local account. In this example, the group data value 422 and the materiality information 432 and 434 may be confidential data values that are restricted from view to a local user but are shown here for further understanding.

In the example of FIG. 4A, a local data value 412 and a corresponding group data value 422 are paired or otherwise matched with one another via the user interface 400A. Next, the local data value 412 and the group data value 422 are processed with respect to a materiality threshold 434 for the respective group data value 422. Here, the system may determine whether a contribution 432 of the local data value 412 is greater than (or otherwise impacts) a materiality threshold for the group data value 422. A materiality indicator 436 may be generated and displayed based on the materiality determination. The materiality threshold 434 may be different for each respective group data value 422 based on various attributes of the data. The attributes may be default attributes of the system or the attributes may be customized by the entity/group. Attributes include size of the entity, nature of the entity, relevance of the data value to the entity, completeness of the data value, reliability of the data value, and the like. Materiality may be determined based on the local data value 412, the group data value 422, and one or more materiality programs.

In the example of FIG. 4A, the first and fourth rows of local data values 412 materially affect the corresponding group data values 422 based on different materiality standards for each group data value. As will be appreciated, in this example, the second row has a local data value that consists of a greater contribution to its respective group data value than a local data value in the fourth row, however, the second local data value is not material to the second group data value while the fourth local data value is due to different dynamic attributes of the second and fourth group data values.

FIG. 4B illustrates a user interface 400B displaying additional examples of materiality indicators 441 and 451. However, in the example of FIG. 4B, the confidential information shown in FIG. 4A has been removed or otherwise prevented from being displayed. In the first example of user interface 400B, the materiality indicator 441 is disposed within an additional column of data and provides a textual description. Here, the text description may include a "yes" or "no" text value. As another example, the text description may include other terms and/or phrases such as borderline, critical, no contribution, some contribution, close, or the like. In the second example of user interface 400B, the materiality indicator 451 is generated by manipulating a text of other data values without requiring an additional column or row of data. As another example, a color, a shading, a text style, a symbol, or the like, may be added to the row or column of data to thereby visually indicate that a local data value impacts or does not impact a materiality threshold.

FIG. 5 illustrates a method 500 for generating and providing materiality indicators in accordance with an example embodiment. The method 500 may be performed by a computing device such as a web server, a database, a cloud platform, a user device, a kiosk, a combination of the devices, and the like. For example, the method 500 may be performed by one or more of a local system 110 and the host platform 120 shown in FIG. 1. Referring to FIG. 5, in 510, the method includes receiving at least one group data file and at least one local data file. For example, the group data file may include a list of confidential group data values that have values generated by aggregating values from a group of users (e.g., organizations, companies, entities, etc.) and the local data file may include local data values of a local user that are to be combined with the other group users.

As a non-limiting example, the group data file may correspond to a parent organization and the local data file may correspond to a subsidiary of the parent organization, but embodiments are not limited thereto. As another example, the group data file may correspond to a common data file of an organization and the local data file may correspond to a business unit within the organization from among a plurality of units or areas. The group data file may aggregate values from the group as a whole and may be generated for accrual purposes to satisfy various government regulations and policies. In this example, the local data file may include codes (e.g., accounts, descriptors, attributes, etc.) which are being mapped to respective codes in the group data file or global data file. In this case, each local data file may have its own respective code that is mapped to a universal code for the group as a whole which is included in the group data file.

In 520, the method includes identifying a local data value from the local data file and a corresponding confidential group data value from the group data file. For example, the processor or other device may match a local data value with a corresponding group data value in order to perform a mapping process. In some embodiments, the local data file may include a plurality of local data values in tabular storage format (e.g., having rows, columns, headers, etc.). The processor may match each local data value to its corresponding group data value even when the local data file and the group data file are arranged in a different order or a different format.

In 530, the method includes determining whether an error or an omission in combining the local data value with the confidential group data value is going to impact a materiality threshold of the confidential group data value based on a plurality of dynamic materiality attributes. Here, the materiality threshold may be based on the item represented by the group data value and may be different or otherwise dynamically determined based on different attributes of the item and of the entity which is represented by the group. The materiality threshold for a data value may depend on one or more dynamic materiality attributes such as a size of the entity represented by the group, a type of the entity, a relevance of the data value to the entity, a reliability of the data value, a completeness of the data value, and/or the like. The attributes may be used to dynamically determine or customize a materiality threshold for the group data value. Also, the materiality threshold may include a plurality of different materiality thresholds.

In 540, the method includes generating a materiality indicator that indicates whether the local data value impacts a materiality threshold of the confidential group data value, and in 550, outputting a user interface displaying the local data value and the materiality indicator of the corresponding confidential group data value without displaying the corresponding confidential group data value. In other words, the local data value may be displayed along with a materiality indicator for a confidential group data value without displaying the confidential group data value. Accordingly, confidential values that are not to be viewed by individual subsidiaries, local users, etc., can be blocked or otherwise obscured, while still providing the local user with an indication of the materiality of the local data value with respect to the larger group data value.

According to various aspects, the materiality indicator may include a wording, a color, a shading, a symbol, a weighted line, and/or the like, which is used to visually differentiate when the local data value is material and when the local data value is not material. In a simple example, the materiality indicator may be a "yes" or "no" value. As another example, the materiality indicator may provide a description such as not material, material, very material, critical, etc. It should also be appreciated that different levels of materiality can be provided by the indicator such as "borderline," "significant," "critical," and the like. As another example, the materiality indicator may be a coloring or a shading of the background and/or the text. As another example, the materiality indicator may be a symbol, a highlighting function, a phrase, a numerical value, and/or the like.

The materiality threshold may identify a threshold at which an omission of the local data value from inclusion within the confidential group data value is going to impact the materiality threshold for the confidential group data value. As another example, or in addition, the materiality threshold may identify whether incorrectly aggregating the local data value with the confidential group data value is going to impact the materiality threshold for the confidential group data value. In these examples herein, the materiality threshold may identify a predetermined threshold at which missing or incorrect information in a statement is expected to influence decisions of users taken on the basis of the statement. Materiality is governed by the United States by the Sarbanes Oxley Act of 2002, as well as other regulations, and is designed to protect investors for fraudulent accruals and accounting practices.

In some embodiments, the method 500 may include identifying a plurality of local data values and a corresponding plurality of respective confidential global data values, and the determining may determine whether a respective omission or a respective error in combining each local data value with its respective confidential global data value is going to impact a materiality of each respective confidential global data value. In this example, the generating may further include generating a respective materiality indicator for each local data value that indicates whether the respective local data value is going to impact a materiality threshold of the confidential group data value, and the outputting may include outputting the user interface displaying each local data value and each respective materiality indicator.

Figure 6:
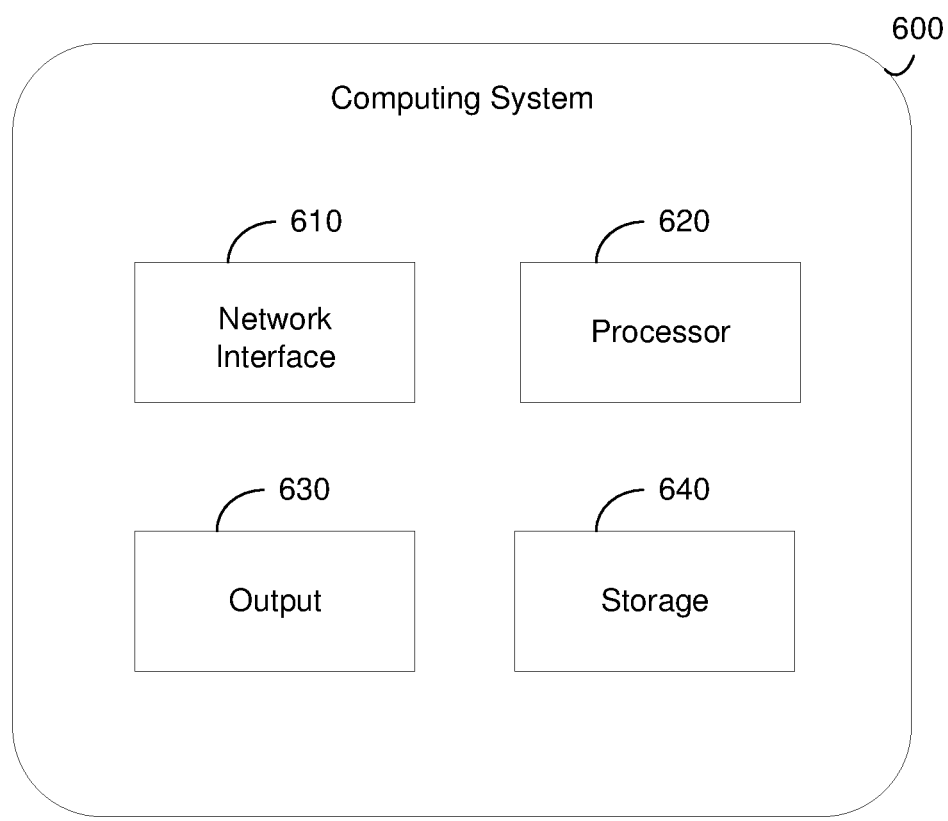
FIG. 6 is a diagram illustrating a computing system in accordance with an example embodiment.

FIG. 6 illustrates a computing system 600 that can generate and manage the dashboard described herein including the time range selector and the interactive bar chart, in accordance with an example embodiment. For example, the computing system 600 may be a web server, a database, a cloud platform, a user device, a server, or the like. In some embodiments, the computing system 600 may be distributed across multiple devices. Referring to FIG. 6, the computing system 600 includes a network interface 610, a processor 620, an output 630, and a storage device 640 such as a memory. Although not shown in FIG. 6, the computing system 600 may also include or be electronically connected to other components such as a display, an input unit, a receiver, a transmitter, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the computing system 1000, an externally connected display, a display connected to the cloud, another device, and the like. For example, the output 630 may include a port, an interface, a cable, a wire, a board, and/or the like, with input/output capabilities. The storage device 640 is not limited to a particular storage device and may include any known memory device such as RAM, ROM, hard disk, and the like, and may or may not be included within the cloud environment. The storage 640 may store software modules or other instructions which can be executed by the processor 620 to perform the method 500 shown in FIG. 5.

According to various embodiments, the network interface 610 may receive a local data file from one or more local systems, and a group data file from a central system such as a server or database. The storage device 640 may store the group data file and the local data file. According to various embodiments, the group data file may include confidential group data values combined from a group of users while the local data file may include local data values of a local user to be combined with the group. The processor 620 may identify a local data value from the local data file and a corresponding confidential group data value from the group data file. For example, the processor 620 may automatically match a local data value to its corresponding group data value.

According to various embodiments, the processor 620 may further determine whether an error or an omission in combining the local data value with the confidential group data value is going to impact a materiality threshold of the confidential group data value based on a plurality of dynamic materiality attributes, and generate a materiality indicator that indicates whether the local data value impacts a materiality threshold of the confidential group data value. The output 630 may output a user interface displaying the local data value and the materiality indicator of the corresponding confidential group data value without displaying the corresponding confidential group data value.

The materiality threshold may be determined differently based on attributes of the group data value. As a result, the materiality threshold may be different or dynamically determined based on one or more attributes of the group data value and/or an organization associated with the group data value. For example, the materiality threshold for a group data value may depend on one or more dynamic materiality attributes such as a size of an entity represented by the group, a nature of business of the entity, a relevance of the data value to the entity's purpose, a reliability of the data value, a completeness of the data value, and/or the like.

The materiality threshold may define a threshold at which an omission of the local data value from inclusion within the confidential group data value is going to impact the materiality threshold for the confidential group data value. The materiality threshold may also or instead identify a threshold at which incorrectly aggregating the local data value with the confidential group data value is going to impact the materiality threshold for the confidential group data value. For example, a range of acceptable error.

The materiality indicator may include a word or a phrase that describes whether the local data value impacts the materiality of the global data value. As another example, the materiality threshold may include a shading, a color, a background, a text editing function, a highlighting, or the like, without having to add additional wording to the data to identify that the local data value is material to the group data value.

In some embodiments, the processor 620 may identify a plurality of local data values and a corresponding plurality of respective confidential global data values, and determine whether a respective omission or a respective error in combining each local data value with its respective confidential global data value is going to impact a materiality of each respective confidential global data value. In this example, the processor 620 may generate a respective materiality indicator for each local data value that indicates whether the respective local data value is going to impact a materiality threshold of the confidential group data value, and the output 630 may output the user interface displaying each local data value and each respective materiality indicator.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a network interface configured to receive, from a central host device, a group data file comprising confidential group data values combined from a group of local devices;
   a processor configured to
      map, via a local device, a local data value from a local data file on the local device to a confidential group data value in the group data file received from the central host device based on identification codes of the local data value and the confidential group data value,
      display, via the local device, a data structure which comprises a field with an identifier value of the local data value therein and a field with the local data value therein,
      hide the mapped confidential group data value in the group data file from the central host device thereby preventing it from being displayed via the local device,
      detect that an error or an omission in combining the local data value mapped with the hidden confidential group data value is going to impact a materiality threshold of the hidden confidential group data value based on a plurality of dynamic materiality attributes, generate a materiality indicator that indicates whether the local data value impacts a materiality threshold of the hidden confidential group data value, and display, via the local device, the materiality indicator of the corresponding hidden confidential group data value within the data structure in relation to the fields of the identifier value of the local data value and the local data value.

2. The computing system of claim 1, wherein the processor is configured to determine that omission of the local data value from inclusion within the hidden confidential group data value is going to impact the materiality threshold for the hidden confidential group data value.

3. The computing system of claim 1, wherein the processor is configured to determine that incorrectly aggregating the local data value with the hidden confidential group data value is going to impact the materiality threshold for the hidden confidential group data value.

4. The computing system of claim 1, wherein the materiality threshold comprises a predetermined threshold at which missing or incorrect information is expected to influence decisions of users taken on the basis of the statement.

5. The computing system of claim 1, wherein the plurality of dynamic materiality attributes comprise a size of an entity represented by the group and a nature of business of the entity.

6. The computing system of claim 1, wherein the generated materiality indicator comprises a word or a phrase that describes whether the local data value impacts the materiality of the hidden confidential group data value.

7. The computing system of claim 1, wherein the processor is configured to identify a plurality of local data values and a corresponding plurality of respective confidential group data values, and determine whether a respective omission or a respective error in combining each local data value with its respective confidential group data value is going to impact a materiality of each respective confidential group data value.

8. The computing system of claim 7, wherein the processor is configured to generate a respective materiality indicator for each local data value that indicates whether the respective local data value is going to impact a materiality threshold of a corresponding confidential group data value.

9. A computer-implemented method comprising:

receiving, from a central host device, a group data file comprising confidential group data values combined from a group local device;

mapping, via a local device, a local data value from a local data file on the local device to a confidential group data value in the group data file received from the central host device based on identification codes of the local data value and the confidential group data value;

displaying, via the local device, a data structure which comprises a field with an identifier value of the local data value therein and a field with the local data value therein;

hiding the mapped confidential group data value in the group data file from the central host device thereby preventing it from being displayed via the local device;

detecting that an error or an omission in combining the local data value mapped with the hidden confidential group data value is going to impact a materiality threshold of the hidden confidential group data value based on a plurality of dynamic materiality attributes;

generating a materiality indicator that indicates whether the local data value impacts a materiality threshold of the hidden confidential group data value; and displaying, via the local device, the materiality indicator of the corresponding hidden confidential group data value within the data structure in relation to the fields of the identifier value of the local data value and the local data value.

10. The computer-implemented method of claim 9, wherein the determining comprises determining that omission of the local data value from inclusion within the hidden confidential group data value is going to impact the materiality threshold for the hidden confidential group data value.

11. The computer-implemented method of claim 9, wherein the determining comprises determining that incorrectly aggregating the local data value with the hidden confidential group data value is going to impact the materiality threshold for the hidden confidential group data value.

12. The computer-implemented method of claim 9, wherein the materiality threshold comprises a predetermined threshold at which missing or incorrect information in a statement is expected to influence decisions of users taken on the basis of the statement.

13. The computer-implemented method of claim 9, wherein the plurality of dynamic materiality attributes comprise a size of an entity represented by the group and a nature of business of the entity.

14. The computer-implemented method of claim 9, wherein the materiality indicator comprises a word or a phrase that describes whether the local data value impacts the materiality of the hidden confidential group data value.

15. The computer-implemented method of claim 9, wherein the identifying comprises identifying a plurality of local data values and a corresponding plurality of respective confidential group data values, and the determining comprises determining whether a respective omission or a respective error in combining each local data value with its respective confidential group data value is going to impact a materiality of each respective confidential group data value.

16. The computer-implemented method of claim 15, wherein the generating comprises generating a respective materiality indicator for each local data value that indicates whether the respective local data value is going to impact a materiality threshold of a corresponding confidential group data value.

17. A non-transitory computer-readable storage medium storing program instructions that when executed cause a processor to perform a method comprising:

receiving, from a central host device, a group data file comprising confidential group data values combined from a group of local devices;

mapping, via a local device, a local data value from a local data file on the local device to a confidential group data value in the group data file received from the central host device based on identification codes of the local data value and the confidential group data value;

displaying, via the local device, a data structure which comprises a field with an identifier value of the local data value therein and a field with the local data value therein;

hiding the mapped confidential group data value in the group data file from the central host device thereby preventing it from being displayed via the local device;

detecting that an error or an omission in combining the local data value mapped with the hidden confidential group data value is going to impact a materiality threshold of the hidden confidential group data value based on a plurality of dynamic materiality attributes;

generating a materiality indicator that indicates whether the local data value impacts a materiality threshold of the hidden confidential group data value; and displaying, via the local device, the materiality indicator of the corresponding hidden confidential group data value within the data structure in relation to the fields of the identifier value of the local data value and the local data value.

18. The non-transitory computer readable medium of claim 17, wherein the determining comprises determining that omission of the local data value from inclusion within the hidden confidential group data value is going to impact the materiality threshold for the hidden confidential group data value.

19. The non-transitory computer readable medium of claim 17, wherein the determining comprises determining that incorrectly aggregating the local data value with the hidden confidential group data value is going to impact the materiality threshold for the hidden confidential group data value.

20. The non-transitory computer readable medium of claim 17, wherein the materiality threshold comprises a predetermined threshold at which missing or incorrect information in a statement is expected to influence decisions of users taken on the basis of the statement.

* * * * *